(12) United States Patent
Khandekar et al.

(10) Patent No.: US 8,630,241 B2
(45) Date of Patent: Jan. 14, 2014

(54) FRAME STRUCTURES FOR WIRELESS COMMUNICATION SYSTEMS

(75) Inventors: Aamod Khandekar, San Diego, CA (US); Alexei Gorokhov, San Diego, CA (US); Naga Bhushan, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 790 days.

(21) Appl. No.: 12/441,109

(22) PCT Filed: Oct. 23, 2007

(86) PCT No.: PCT/US2007/082209
§ 371 (c)(1), (2), (4) Date: Mar. 12, 2009

(87) PCT Pub. No.: WO2008/070316
PCT Pub. Date: Jun. 12, 2008

(65) Prior Publication Data
US 2009/0232079 A1    Sep. 17, 2009

Related U.S. Application Data

(60) Provisional application No. 60/862,744, filed on Oct. 24, 2006, provisional application No. 60/862,641, filed on Oct. 24, 2006.

(51) Int. Cl.
*H04J 4/00* (2006.01)
(52) U.S. Cl.
USPC .......................................................... 370/329
(58) Field of Classification Search
None
See application file for complete search history.

(56) References Cited

U.S. PATENT DOCUMENTS

| | | | |
|---|---|---|---|
| 6,408,033 B1 | 6/2002 | Chow et al. | |
| 7,496,113 B2 | 2/2009 | Cai et al. | |
| 8,027,372 B2 | 9/2011 | Khandekar et al. | |
| 2001/0031647 A1* | 10/2001 | Scherzer et al. | 455/562 |
| 2003/0224731 A1 | 12/2003 | Yamaura et al. | |
| 2004/0179627 A1 | 9/2004 | Ketchum et al. | |
| 2005/0249159 A1* | 11/2005 | Abraham et al. | 370/329 |
| 2005/0281316 A1 | 12/2005 | Jang et al. | |
| 2006/0034385 A1 | 2/2006 | Egashira et al. | |
| 2006/0062196 A1* | 3/2006 | Cai et al. | 370/345 |
| 2006/0277292 A1* | 12/2006 | Hardie | 709/224 |

(Continued)

FOREIGN PATENT DOCUMENTS

| | | |
|---|---|---|
| EP | 1533950 | 5/2005 |
| EP | 1619847 | 1/2006 |

(Continued)

OTHER PUBLICATIONS

International Search Report, PCT/US2007/082209, International Search Authority—European Patent Office, Jul. 10, 2008.

(Continued)

*Primary Examiner* — John Blanton
(74) *Attorney, Agent, or Firm* — Peng Zhu

(57) ABSTRACT

Superframe preamble structures for wireless communication systems are provided. The preamble can include system determination information, which can improve acquisition performance. The superframe structures can allow efficient determination of flexible parameters that determine preamble structure. The superframe structures can also facilitate quick paging capacity to scale with bandwidth.

86 Claims, 10 Drawing Sheets

(56) References Cited

U.S. PATENT DOCUMENTS

| | | |
|---|---|---|
| 2006/0291431 A1* | 12/2006 | Pajukoski et al. ............. 370/335 |
| 2007/0026896 A1* | 2/2007 | Han et al. ...................... 455/561 |
| 2007/0041311 A1* | 2/2007 | Baum et al. ................... 370/208 |
| 2007/0165726 A1* | 7/2007 | Ding et al. .................... 375/260 |
| 2007/0242600 A1 | 10/2007 | Li et al. |
| 2008/0043879 A1 | 2/2008 | Gorokhov et al. |
| 2008/0062936 A1* | 3/2008 | He et al. ....................... 370/338 |
| 2008/0279220 A1 | 11/2008 | Wang |
| 2009/0141818 A1* | 6/2009 | Hiramatsu et al. ............. 375/260 |
| 2009/0213765 A1* | 8/2009 | Rinne et al. ................... 370/278 |
| 2009/0296563 A1* | 12/2009 | Kishiyama et al. ........... 370/210 |
| 2010/0027486 A1 | 2/2010 | Gorokhov et al. |

FOREIGN PATENT DOCUMENTS

| | | |
|---|---|---|
| JP | 2003249908 A | 9/2003 |
| JP | 2005054661 A | 3/2005 |
| JP | 2006014321 A | 1/2006 |
| RU | 2139642 | 10/1999 |
| WO | 0001127 | 1/2000 |
| WO | 2004100577 | 11/2004 |
| WO | WO2005112566 A2 | 12/2005 |
| WO | 2006075732 A1 | 7/2006 |
| WO | WO2006096764 A2 | 9/2006 |
| WO | 2006134829 A1 | 12/2006 |

OTHER PUBLICATIONS

Written Opinion—PCT/US07/082209, International Searching Authority—European Patent Office, Oct. 7, 2008.

Taiwan Search Report—TW096139900—TIPO—Feb. 11, 2012.

* cited by examiner

FRAME STRUCTURES FOR WIRELESS COMMUNICATION SYSTEMS

CROSS-REFERENCE

This application claims the benefit of U.S. Provisional Application Ser. No. 60/862,641, filed Oct. 24, 2006, entitled "FRAME STRUCTURES FOR WIRELESS COMMUNICATION SYSTEMS" and U.S. Provisional Application Ser. No. 60/862,744, filed Oct. 24, 2006, entitled "FRAME STRUCTURES FOR WIRELESS COMMUNICATION SYSTEMS". The entirety of these applications are incorporated herein by reference.

BACKGROUND

I. Field

The following description relates generally to wireless communication, and amongst other things, to frame structures for wireless communication systems.

II. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices, such as cellular telephones, has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with one or more time slot and subcarrier combinations for transmitting and receiving information in a defined burst period or frame. The hopping schemes may generally be a symbol rate hopping scheme or a block-hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all the data streams transmitted from the base station. Likewise, a mobile terminal can transmit data to the base station or another mobile terminal. In these systems, the bandwidth and other system resources are assigned utilizing a scheduler.

For the case of large deployment bandwidths, often the channel becomes dispersive and the frequency response varies across the bandwidth.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with providing superframe structures that can provide improved acquisition performance. The superframe structures can also allow efficient determination of flexible parameters that determine preamble structure. The superframe structures can also facilitate quick paging capacity to scale with bandwidth.

An aspect relates to a method for transmitting information in a wireless communication system. The method includes generating a first acquisition pilot that carries system determination information and transmitting the first acquisition pilot to terminals within the wireless communication system. The superframe preamble can include the first acquisition pilot. The first acquisition pilot can be carried within a superframe preamble A wireless communications apparatus that includes at least one processor and a memory is another aspect. The at least one processor is configured to create a first acquisition pilot that carries system determination information and transmit the first acquisition pilot. The memory is coupled to the at least one processor.

Another aspect relates to a wireless communications apparatus that communicates superframe preamble information. The wireless communications apparatus includes a means for generating a first acquisition pilot that carries system determination information. Also included in the apparatus is a means for transmitting first acquisition pilot. The first acquisition pilot can be carried within a superframe preamble.

A computer program product that includes a computer-readable medium is a related aspect. The computer-readable medium can include code for causing at least one computer to create a first acquisition pilot that carries system determination information. The computer-readable medium can also include code for causing the at least one computer to convey first acquisition pilot to terminals within the wireless communication system. The first acquisition pilot can be carried within a superframe preamble.

Another aspect relates to a wireless communication apparatus that includes a processor. The processor can be configured to generate a first acquisition pilot that carries system determination information and transmit the first acquisition pilot to terminals within the wireless communication system. There is also a memory coupled to the processor.

A related aspect is a method for receiving information in a wireless communications environment. The method includes detecting a first acquisition pilot and utilizing the first acquisition pilot to obtain system determination information. The first acquisition pilot can include system determination information.

A further aspect relates to a wireless communications apparatus that includes at least one processor and a memory coupled to the at least one processor. The processor can be configured to detect a first acquisition pilot and utilize the first acquisition pilot to obtain system determination information. The first acquisition pilot can be carried within a superframe preamble.

A wireless communications apparatus that receives superframe preamble information is another related aspect. The apparatus can include a means for detecting a first acquisition pilot. Also included in the apparatus can be a means for utilizing the first acquisition pilot to obtain system determination information.

Still another aspect relates to a computer program product that includes a computer-readable medium. The computer-readable medium can include code for causing at least one computer to discover a first acquisition pilot. The computer-readable medium can also include code for causing the at least one computer to obtain system determination information by analyzing the first acquisition pilot. The first acquisition pilot can indicate whether synchronous or asynchronous operation is utilized, whether half-duplex operation is utilized, whether frequency re-use is utilized by a superframe, or combinations thereof.

A further aspect relates to a wireless communication apparatus that includes a processor. The processor can be configured to detect a first acquisition pilot that includes system determination information and interpret the system determination included in the first acquisition pilot. A memory can be coupled to the processor.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
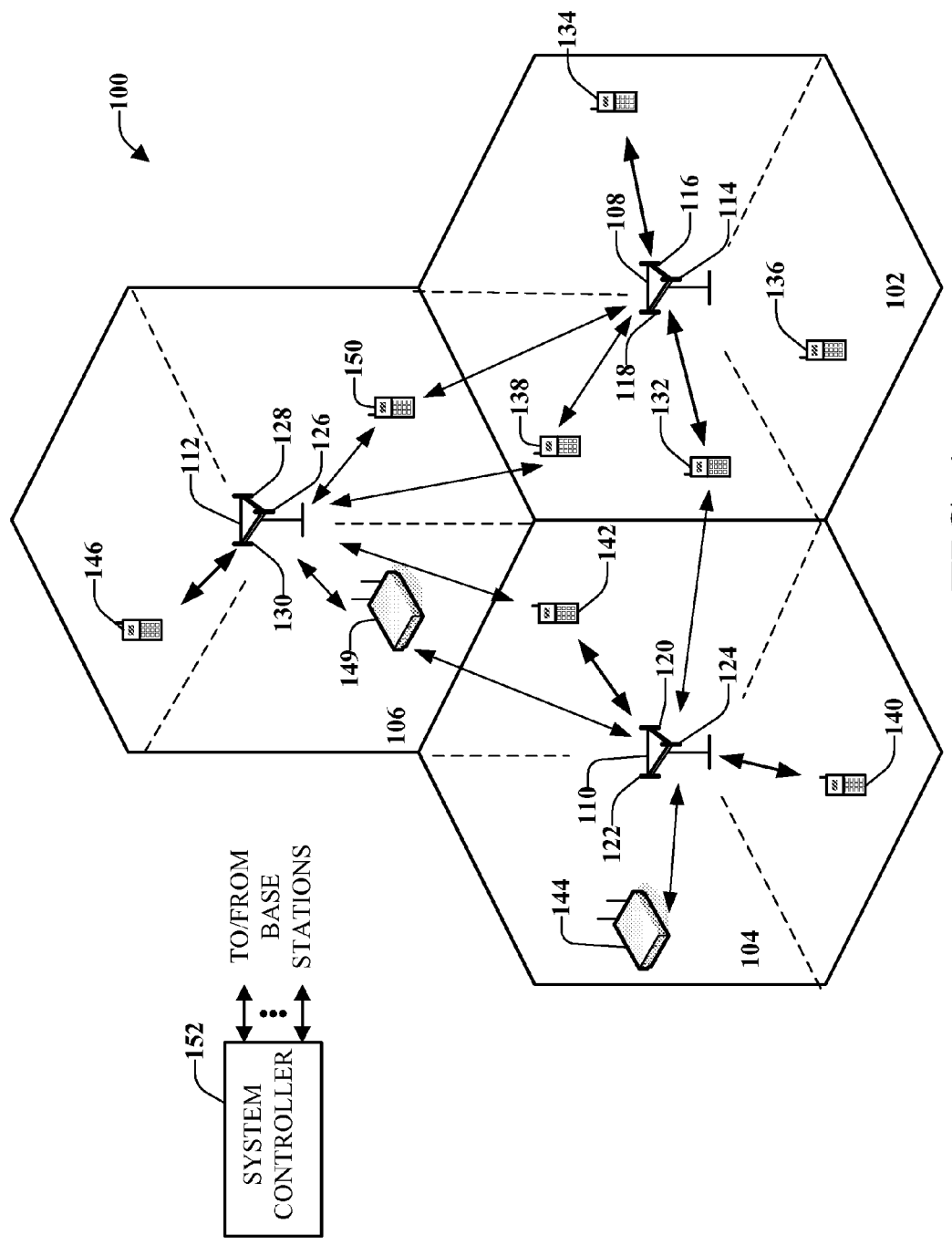
FIG. 1 illustrates a multiple access wireless communication system that can utilize the frame structures disclosed herein.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules and/or may not include all of the devices, components, modules discussed in connection with the figures. A combination of these approaches may also be used.

FIG. 1 illustrates a multiple access wireless communication system 100 that can utilize the frame structures disclosed herein. In further detail, a multiple access wireless communication system 100 includes multiple cells, e.g. cells 102, 104, and 106. In the embodiment of FIG. 1, each cell 102, 104, and 106 may include an access point 108, 110, 112 that includes multiple sectors. The multiple sectors are formed by groups of antennas each responsible for communication with access terminals in a portion of the cell. In cell 102, antenna groups 114, 116, and 118 each correspond to a different sector. In cell 104, antenna groups 120, 122, and 124 each correspond to a different sector. In cell 106, antenna groups 126, 128 and 130 each correspond to a different sector.

Each cell includes several access terminals, which are in communication with one or more sectors of each access point. For example, access terminals 132, 134, 136, and 138 are in communication with base station 108, access terminals 140, 142, and 144 are in communication with access point 110, and access terminals 146, 149, and 150 are in communication with access point 112.

As illustrated in cell 104, for example, each access terminal 140, 142, and 144 is located in a different portion of it respective cell than each other access terminal in the same cell. Further, each access terminal 140, 142, and 144 may be a different distance from the corresponding antenna groups with which it is communicating. Both of these factors provide situations, also due to environmental and other conditions in the cell, to cause different channel conditions to be present between each access terminal and its corresponding antenna group with which it is communicating.

A controller 152 is coupled to each of the cells 102, 104, and 106. Controller 152 can contain one or more connections to multiple networks, such as the Internet, other packet based networks, or circuit switched voice networks that provide information to, and from, the access terminals in communication with the cells of the multiple access wireless communication system 100. Controller 152 includes, or is coupled with a scheduler that schedules transmission from and to access terminals. In some embodiments, scheduler may reside in each individual cell, each sector of a cell, or a combination thereof.

Each of the sectors can operate utilizing one or more of a multitude of carriers. Each carrier is a portion of a larger bandwidth in which the system can operate, or is available for communication. A single sector utilizing one or more carriers can have multiple access terminals scheduled on each of the different carriers during any given time interval (e.g., frame or superframe). Further, one or more access terminals can be scheduled on multiple carriers at substantially the same time.

An access terminal may be scheduled in one carrier or more than one carrier according to its capabilities. These capabilities may be part of the session information that is generated when the access terminal attempts to acquire communication or that has been negotiated previously, can be part of the identification information that is transmitted by the access terminal, or can be established according to other approaches. In certain aspects, the session information may comprise a session identification token that is generated by querying the access terminal or determining its capabilities through its transmissions.

Further, in some aspects, acquisition pilots, which can be included in a superframe preamble, can be provided on only one carrier or a portion of one carrier for any given superframe. In other aspects, only portions of the superframe preamble (e.g., the pilots or the acquisition pilots) might have a bandwidth of less than a carrier, while other portions of the superframe preamble have a larger bandwidth.

As used herein, an access point can be a fixed station used for communicating with the terminals and can also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors (e.g., having different antenna groups for different sectors), other approaches may be utilized. For example, multiple fixed "beams" that each cover different areas of the cell in frequency space may be utilized in place of, or in combination with, physical sectors.

Figure 2:
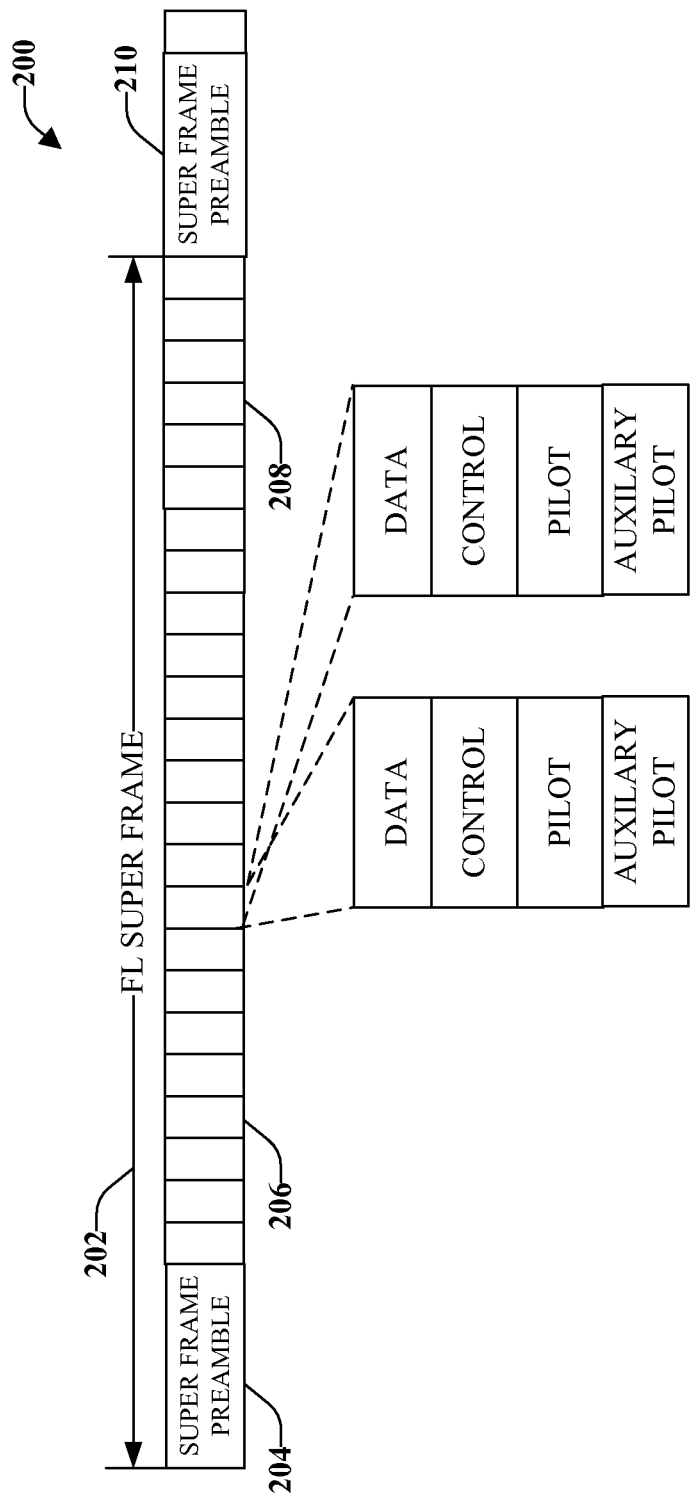
FIG. 2 illustrates aspects of superframe structures for a frequency division duplexed (FDD) multiple access wireless communication system.
Figure 3:
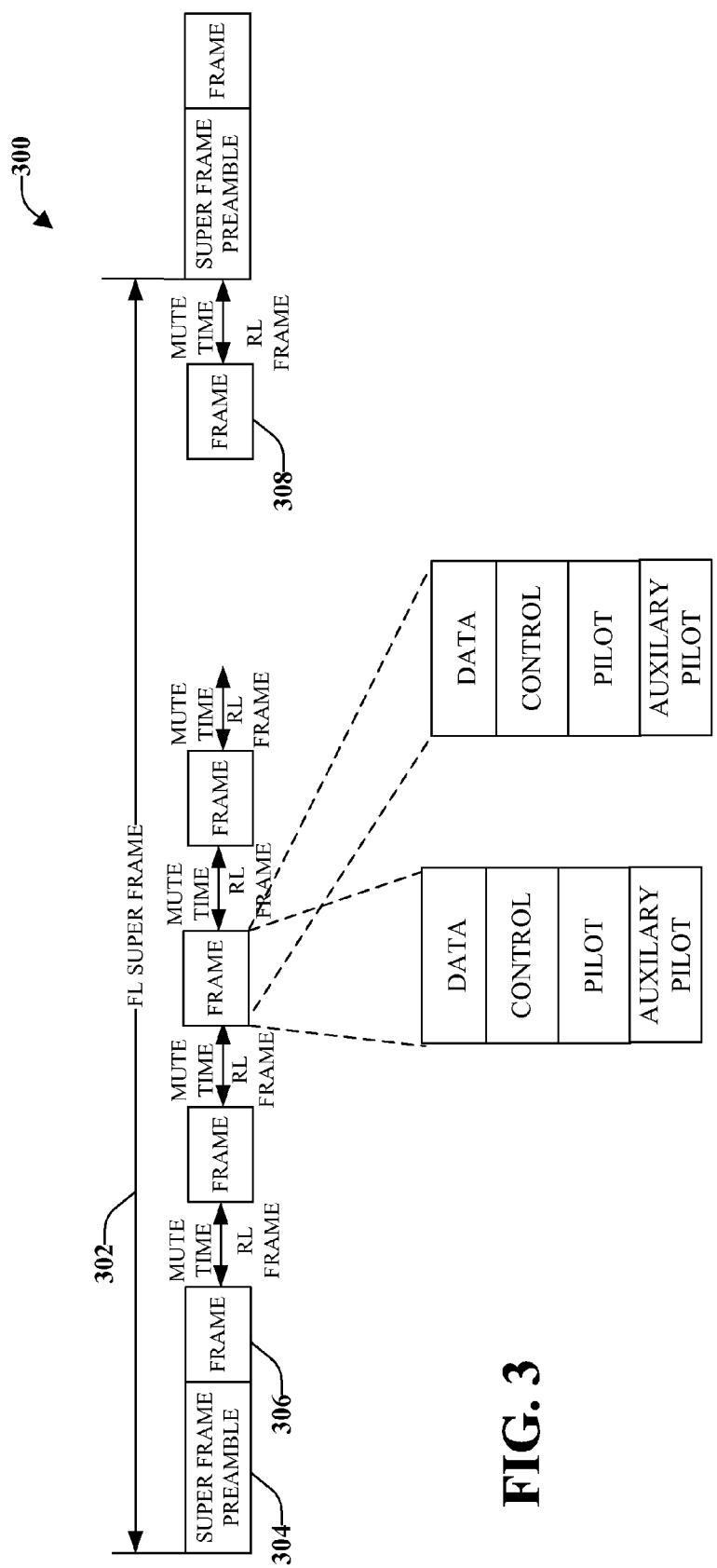
FIG. 3 illustrates aspects of superframe structures for a time division duplexed (TDD) multiple access wireless communication system.

In order to fully appreciate the disclosed aspects, superframe structures for multiple access wireless communication systems will be discussed. FIG. 2 illustrates aspects of superframe structures 200 for a frequency division duplexed (FDD) multiple access wireless communication system. FIG. 3 illustrates aspects of superframe structures 300 for a time division duplexed (TDD) multiple access wireless communication system. In certain aspects, a superframe preamble, or portions thereof, can span one carrier or less than one carrier. Further, in some aspects a center subcarrier of a given carrier can be a center subcarrier, or substantially a center subcarrier, of a superframe preamble.

The forward link transmission is divided into units of superframes 202, 302 that can include a superframe preamble 204, 304 followed by a series of physical layer frames, a few of which are labeled at 206, 208, 306, and 308. In an FDD system 200, the reverse link and the forward link transmission can occupy different frequency bandwidths so that transmissions on the links do not, or for the most part do not, overlap on any frequency subcarriers. In a TDD system 300, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In certain embodiments, the superframe preamble 204, 304 includes pilots for acquisition that can facilitate a terminal obtaining enough information to connect with and utilize a wireless communication system. The preamble can also include one or more of the following control channels: forward-link Primary Broadcast Control Channel (F-PBCCH), forward link Secondary Broadcast Control Channel (F-SBCCH) and forward quick paging channel (F-QPCH). These control channels carry configuration information for the forward link waveform and/or quick paging information for idle-mode users. The physical layer frames can carry data and other control channels than those carried by the preamble 204, 304.

In addition, a pilot channel can include pilots that can be used for channel estimation by access terminals and/or a broadcast channel that includes configuration information that the access terminal can utilize to demodulate the information contained in the forward link frame. Further acquisition information such as timing and other information sufficient for an access terminal to communicate on one of the carriers and basic power control or offset information may also be included in the superframe preamble 204, 304. In other cases, only some of the above and/or other information may be included in the superframe preamble 204, 304. Additionally, other sector interference and paging information may be carried in the superframe preamble 204, 304. The structure of the superframe preamble 204, 304 and the duration between superframe preambles (e.g., between preamble 204 and preamble 210) are dependent upon one or more flexible parameters.

The system bandwidth can include a Fast Fourier Transform (FFT) size and one or more guard subcarriers. In an aspect, paging information may occupy multiple segments of a fixed bandwidth depending on the deployment.

A preamble structure can contain a similar number of bits in F-QPCH for all bandwidth allocations and might maintain the same link budget for all bandwidth allocations. For deployments that are not power limited, the paging capacity can be scaled with bandwidth. The number of F-QPCH segments can be signaled through a bit in F-PBCCH. For example, the paging channel may occupy multiple segments of a specific bandwidth (e.g., 5 MHz each), thus k segments can be allowed when usable bandwidth is at least (512*k−128) subcarriers. Thus, in an aspect, a 10 MHz deployment can have two F-QPCH segments, a 15 MHz deployment can have three F-QPCH segments, etc. The number of paging segments can be signaled through a bit in the broadcast channel or through other means. None of the segments need be centered at the center frequency. Additionally, the broadcast or other information should specify an exact boundary at which the transition is allowed. In accordance with some aspects, F-PBCCH can be repeated in each F-QPCH segment. A choice of 128 guard subcarriers corresponds to a three carrier DO deployment in 5 MHz.

In accordance with some aspects, an acquisition pilot bandwidth is limited to 512 subcarriers, and is centered at or near the center frequency of a carrier. In an aspect, the acquisition bandwidth is fixed and does not change (e.g., no preamble hopping). This can provide a benefit of simplifying search operation and speeding up the acquisition time since the searcher (e.g., terminal) can look in the same location in every superframe. Further, in some aspects, the acquisition pilots, of fixed bandwidth and bandwidth location, in terms of subcarriers, may be used for handoff and active set management, to provide an accurate carrier-to-interference (C/I), or a similar (e.g., Signal-to-Noise-Ratio (SNR), Signal-to-Interference-Plus-Noise Ratio (SINR), interference, and so forth) estimate that can be used for these purposes by the access terminals.

It should be noted in the above aspect, there is no hopping preamble. In a hopping preamble scheme, the interference seen by each sector varies from superframe to superframe. Since the acquisition performance in 5 MHz has a high-quality, any improvements due to hopping are negated by losses in handoff management and in system determination performance. Thus, the above aspect does not utilize preamble hopping.

In another aspect, the cyclic prefix used for symbols in a superframe preamble, or only the acquisition pilot, can be the same as the cyclic prefix used for symbols in the individual frames. In one aspect, an access terminal may determine the cyclic prefix length from the cyclic prefix or by decoding a second of three acquisition pilots. This allows a system wide variance in the cyclic prefix length in one or more portions of a given deployment. The cyclic prefix can be carried in an acquisition pilot and, thus, limiting it to a constant value is not necessary.

As illustrated in FIGS. 2 and 3, the superframe preamble 204, 304 is followed by a sequence of frames. Each frame may include the same or a different number of OFDM symbols, which can include a number of subcarriers that can be simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

In accordance with some aspects, F-PBCCH and F-SBCCH can be carried in the first five OFDM symbols. The F-PBCCH is carried in all superframes while the F-SBCCH and the F-QPCH alternate with each other. For example, F-SBCCH is carried in odd superframes and F-QPCH is carried in even superframes. Thus, F-SBCCH and F-QPCH alternate. F-PBCCH, F-SBCCH, and F-QPCH share a common pilot in both odd and even superframes. F-SBCCH, and F-QPCH can be coded over a single superframe. The F-PBCCH is jointly encoded over sixteen superframes because F-PBCCH carries static deployment wide information (e.g., information that is common from sector to sector).

Additionally, the structure can be different for synchronous and asynchronous systems. In an asynchronous system, even superframes are scrambled using the sector PilotPN and in synchronous systems they are scrambled using the Pilot-Phase. The PilotPN is a 9-bit sector identifier utilized in Ultra Mobile Broadband (UMB). PilotPhase is given by PilotPN+Superframe Index mod 512 (PilotPhase changes every superframe). Even superframes may be scrambled using an SFNID to enable Single Frequency Network (SFN) quick paging operation. In some aspects, SFNID can be equal to Pilot PN. Sectors participating in SFN transmit the same waveform, and, therefore, appear as a single sector transmitting with a higher energy to a terminal receiving the waveform. This technique can mitigate interference caused by one sector to another sector and can result in increased received energy at the terminal. SFN operation between a group of sectors (e.g., sectors of the same cell) can be accomplished by assigning the same SFNID to these sectors.

In accordance with some aspects, the F-PBCCH can occupy the first OFDM symbol in the superframe preamble and the F-SBCCH/F-QPCH can occupy the next four OFDM symbols. Assigning one OFDM symbol worth of bandwidth to PBCCH can facilitate adequate processing gain even in a low-bandwidth (e.g., 1.25 MHz) deployment. An additional advantage can be that idle mode terminals can use this OFDM symbol for Automatic Gain Control (AGC) convergence For example, this can provide that there is no, or little, performance degradation in F-QPCH performance. This is possible because the F-PBCCH carries deployment-specific information that is already known to an idle-mode terminal. Therefore, the terminal does not need to demodulate this OFDM symbol and can instead utilize the received energy during this symbol period as a reference for setting it through Automatic Gain Control (AGC), and the time duration of this OFDM symbol as guard time for allowing the AGC to converge.

A superframe preamble structure can include eight OFDM symbols, the first five symbols can be used to carry the control channels and the last three symbols can carry the acquisition pilot. The acquisition pilot in the superframe preamble can comprise three pilot signals that are separated in time, frequency, or time and frequency. Further information relating to the pilot signals contained in the superframe preamble will be discussed below.

Figure 4:
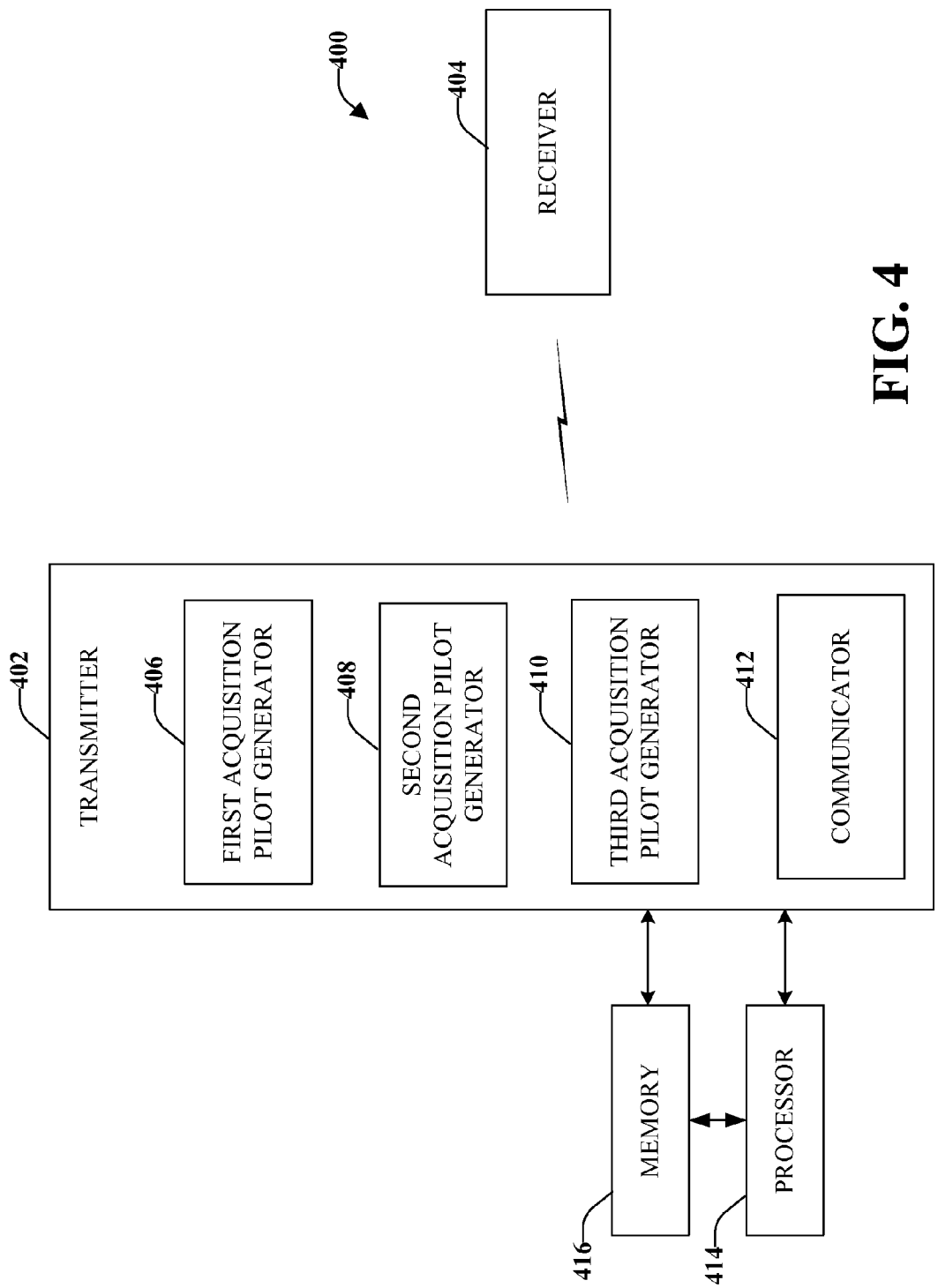
FIG. 4 illustrates an example system that utilizes the disclosed frame structures for communication in a wireless communication environment.

FIG. 4 illustrates an example system 400 that utilizes the disclosed frame structures for communication in a wireless communication environment. System 400 can be configured to modify a superframe preamble that can include system determination information. System 400 includes a transmitter 402 that is in wireless communication with a receiver 404. Transmitter 402 can be a base station and receiver 404 can be a communication device, for example. It should be understood that system 400 can include one or more transmitters 402 and one or more receivers 404. However, only one receiver and only one transmitter are shown for purposes of simplicity.

To convey information to receiver 404, transmitter 402 includes a first pilot acquisition generator 406 that can be configured to create a first acquisition pilot. In accordance with some aspects, the first acquisition pilot is referred to as TDM3. In accordance with some aspects, the first acquisition pilot is orthogonalized with a Walsh code that carries system-determination information. In accordance with some aspects, the first acquisition pilot can further be scrambled by the contents of a second acquisition pilot to distinguish different sectors from each other. In some aspects, system 400 can use this distinction for differential transmission of a forward link other sector information signal (F-OSICH), which may also be part of the superframe preamble and used by receiver 404 to determine the sector for which the OSICH information applies.

The first acquisition pilot can carry nine bits of information. In an aspect, the first acquisition pilot can include one bit indicating whether the sector or access point is part of a synchronous or asynchronous deployment, two bits can indicate a cyclic prefix duration, one bit for indicating enabling of half duplex operation, and four bits can be utilized for indicating least significant bits (LSBs) of system time in an asynchronous deployment. These four bits can be utilized to determine the superframe in which broadcast transmission begins and/or determine the superframe in which Extended Channel Information (ECI) is carried. In an aspect, the ECI carries reverse link configuration information, as well as all the bits of system time. In other aspects, these four bits can also be used for seed information for algorithms like hopping/scrambling that are performed at the receiver 404 (e.g., access terminal).

In a synchronous deployment aspect, the LSBs can be used to carry TDD numerology information (e.g., partitioning between forward and reverse links). Further, one value of the four bits can be reserved for indicating FDD operation. In some aspects, one bit can be used to indicate frequency reuse on superframe channels (e.g., use of multiple access points or sectors of the same bandwidth). In another aspect, for the case of a 5 MHz FFT design, one or more bits may coarsely define the number of guard carriers used.

Also included in transmitter 402 is a second pilot acquisition generator 408 that can be configured to create a second acquisition pilot. In accordance with some aspects, the second acquisition pilot can be referred to as TDM2. In an aspect, the second acquisition pilot is orthogonalized with a Walsh code that depends on PilotPN in the case of asynchronous sectors and on PilotPhase in the case of synchronous sectors. In an aspect, the phase offset may be defined as PilotPN+SuperframeIndex mod 512. A PilotPhase is used in synchronous sectors to allow acquisition pilots to change from superframe to superframe, thus enabling process gains across superframes.

Transmitter 402 can also include a third pilot acquisition generator 410 that can be configured to create a third acquisition pilot. In accordance with some aspects, the third acquisition pilot can be referred to as TDM1. In an aspect, the third acquisition pilot carries a unique sequence that may be independent of PilotPN. In some aspects, the bandwidth spanned by the third acquisition pilot is 5 MHz of subcarriers. In some aspects, the third acquisition pilot for bandwidths lower than 5 MHz can be generated by zeroing out some guard carriers to have the appropriate bandwidth. In an aspect, the third acquisition pilot can be utilized for timing.

In accordance with some aspects, the third acquisition pilot sequence can be independent of the sector identity but might depend on a few bits of system information (e.g., the FFT size utilized by the system and the cyclic prefix length utilized by system). In some aspects, twelve different sequences (about four-bits of information) can be utilized for transmitting the third acquisition pilot. In other aspects, the third acquisition pilot sequence can be unique (e.g., no information bits are transmitted using this sequence). This can mitigate the acquisition complexity since correlating with each of the third acquisition pilot sequences in a real-time manner can constitute a dominant complexity in the acquisition process.

The third acquisition pilot, in accordance with some aspects, carries a time/frequency synchronization pilot that can be independent of PilotPN. Four GCL sequences can be utilized to specify cyclic prefix (CP) duration. The GCL sequences can be based on an FFT size of 128, 256 or 512 tones. Pilot waveform for FFT sizes larger than 512 tones is the same as for 512 tones. GCL sequences can be mapped to every Nth subcarrier, where N is greater than 1, to provide for N repetition in the time domain. The repetitions can be utilized for initial detection of this sequence and/or for frequency correction.

It should be noted, that the first, second, and third acquisition pilots need not be consecutive OFDM symbols in the superframe preamble. However, in accordance with some aspects, the first, second, and third acquisition pilots can be consecutive OFDM symbols. The acquisition pilots can comprise any set of sequences, including, but not limited to orthogonal sequences. The third acquisition pilot GCL sequences might not be orthogonal with respect to each other.

Transmitter 402 also includes a communicator 412 that can be configured to send to the first (TDM3), second (TDM2), and third (TDM1) acquisition pilots to receiver 404. In accordance with some aspects, the first, second, and/or third acquisition pilots can be carried within a superframe preamble. Receiver 404 can utilize this information for improved acquisition performance.

System 400 can include a processor 414 operatively connected to transmitter 402 (and/or a memory 416) to execute instructions relating to generating acquisition pilots and sending the acquisition pilots to a receiver 404. The acquisition pilots can be carried within a superframe preamble. Processor 414 can also execute instructions relating to including the acquisition pilots in a superframe preamble. Processor 414 can also be a processor that controls one or more components of system 400 and/or a processor that both analyzes and generates information received by transmitter 402 and controls one or more components of system 400.

Memory 416 can store information related to the acquisition pilots and/or superframe preambles generated by processor 414 and other suitable information related to communicating information in a wireless communication network. Memory 416 can further store protocols associated with taking action to control communication between transmitter 402 and receiver 404 such that system 400 can employ the stored protocols and/or algorithms to implement the various aspects disclosed herein.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 416 of the disclosed embodiments are intended to comprise, without being limited to, these and other suitable types of memory.

Figure 5:
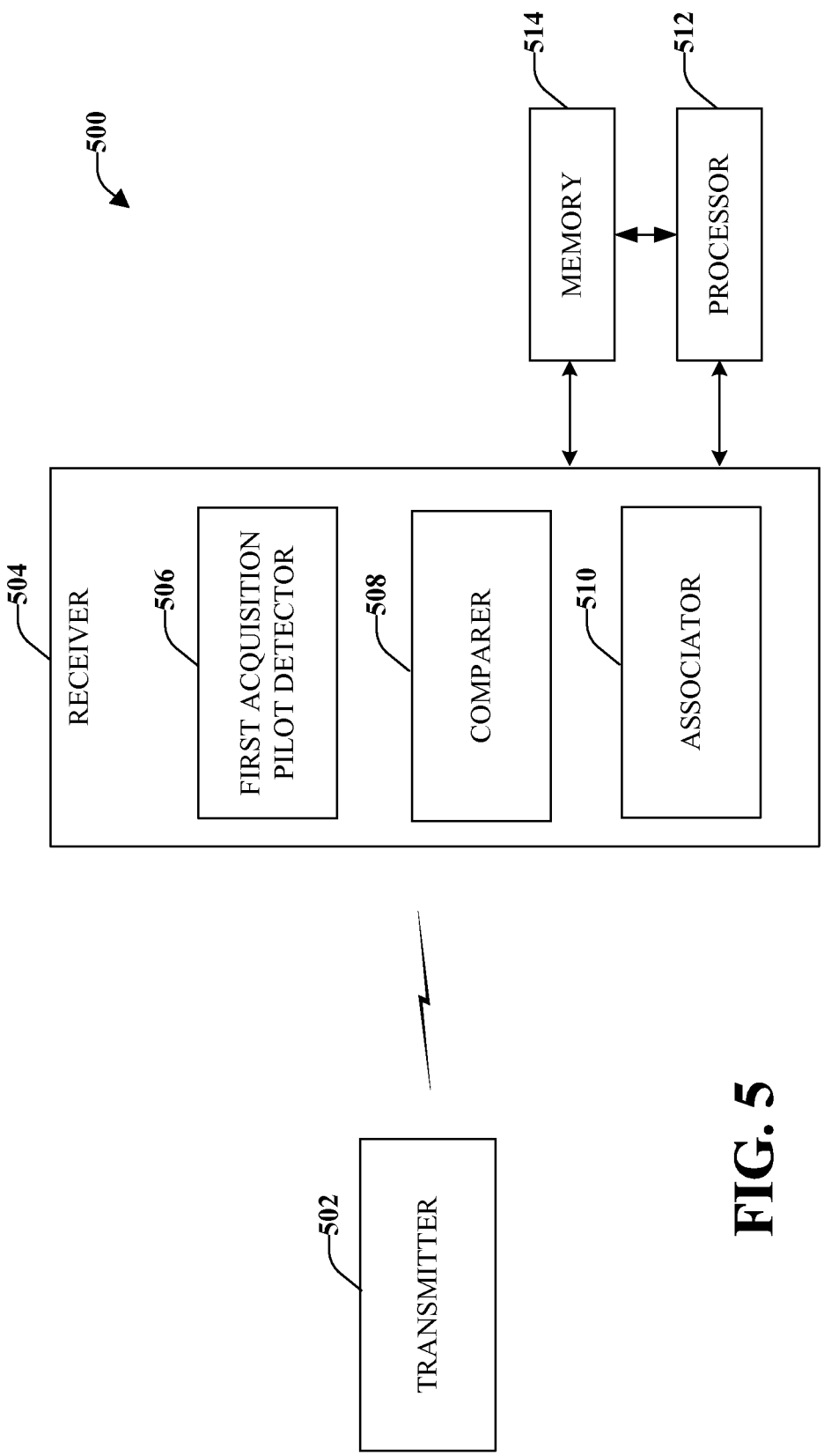
FIG. 5 illustrates a system for receiving the disclosed frame structures for communication in a wireless communication environment.

FIG. 5 illustrates a system 500 for receiving the disclosed frame structures for communication in a wireless communication environment. System 500 can be configured to receive a superframe preamble that includes system-determination information. System 500 can include one or more transmitters 502 in wireless communication with one or more receivers 504.

Receiver 504 can include a first acquisition pilot detector 506 that can be configured to discover a first acquisition pilot (TDM3). The first acquisition pilot can include system determination information. For example, the system determination information can indicate whether synchronous or asynchronous operation is utilized, whether half-duplex operation is utilized, whether frequency re-use is utilized, or combinations thereof. The first acquisition pilot can be carried within a superframe preamble that includes at least three OFDM symbols.

Also included in receiver 504 is a comparer 508 that can be configured to correlate a second acquisition pilot TDM2 utilizing a sector hypothesis. Comparer 508 can correlate with all sector hypotheses using the Fast Hadamard Transform (FHT). In accordance with some aspects, due to symbol repetition, a different time hypotheses can be utilized for 1.25 MHz and 2.5 MHz FFTs.

An associator 510 can be configured to correlate the first acquisition pilot (TDM3) utilizing the information included in the second acquisition pilot. The associator 510 can first descramble TDM3 utilizing the PilotPN (e.g. asynchronous) or PilotPhase (e.g. synchronous) included in TDM2. Information carried on TDM3 can facilitate demodulating F-PBCCH and F-SBCCH, which can carry configuration information that facilitates the receiver 504 demodulating forward link data. For example, each F-PBCCH carries a FFT size and number of guard subcarriers. The F-PBCCH can also carry nine LSBs of system time to enable the receiver 504 to convert PilotPhase into PilotPN for synchronous systems.

In accordance with some aspects, receiver 504 can further be configured to detect a third acquisition pilot (TDM1) over a 1.25 MHz bandwidth. Since the bandwidth can be one of 5 MHz, 2.5 MHz, or 1.25 MHz, using the minimum supported bandwidth (1.25 MHz) to discover TDM1 can provide that no out-of-band interference is detected. In accordance with some aspects, the TDM1 waveforms for all bandwidths appear identical over this frequency (1.25 MHz) span. In accordance with other aspects, different sequences can be utilized for TDM1 depending on the bandwidth. In some aspects where there are three different sequences for bandwidth and four different sequences for FFT size, the receiver can correlate with twelve different sequences.

System 500 can include a processor 512 operatively connected to receiver 504 (and/or a memory 514) to execute instructions relating to discovering a first acquisition pilot, correlating a second acquisition pilot with the first acquisition pilot, and correlating a third acquisition pilot using information included in the second acquisition pilot. Processor 512 can also be a processor that controls one or more components of system 500 and/or a processor that both analyzes and generates information obtained by receiver 504 and controls one or more components of system 500.

Memory 514 can store information related to discovering acquisition pilots and/or correlating acquisition pilots generated by processor 512 and other suitable information related to communicating information in a wireless communication network. Memory 514 can further store protocols associated with taking action to control communication between transmitter 502 and receiver 504 such that system 500 can employ the stored protocols and/or algorithms to implement the various aspects disclosed herein.

Figure 6:
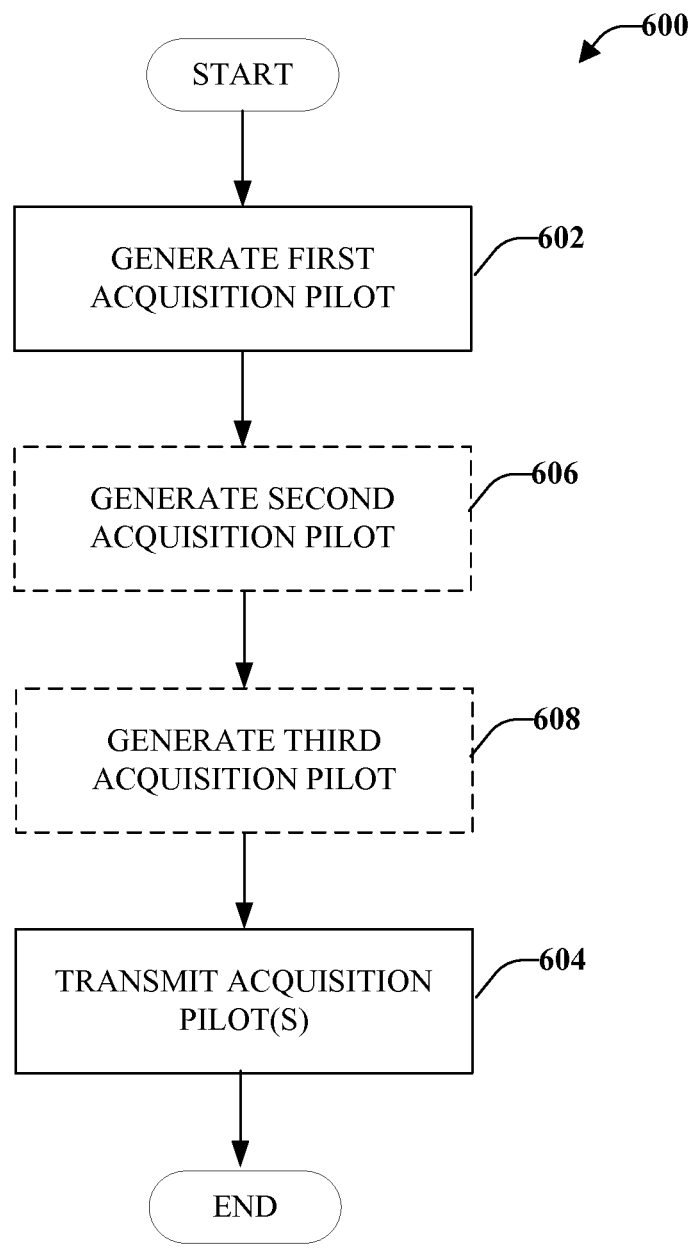
FIG. 6 illustrates a method for transmitting information in a wireless communication system.
Figure 7:
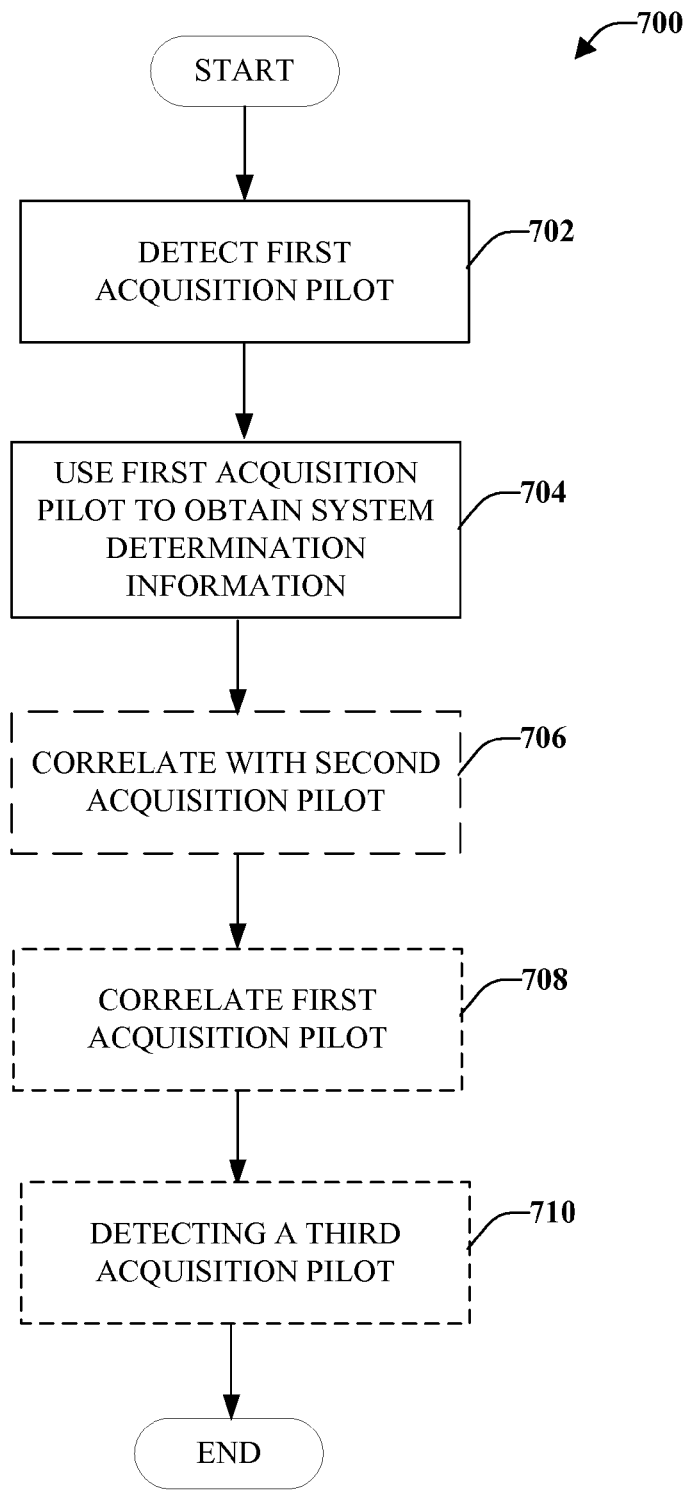
FIG. 7 illustrates a method for receiving an acquisition pilot that includes system-determination information.

In view of the exemplary systems shown and described above, methodologies that may be implemented in accordance with the disclosed subject matter, will be better appreciated with reference to the flow charts of FIGS. 6 and 7. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

With reference now to FIG. 6 illustrated is a method 600 for transmitting information in a wireless communication system. The information transmitted can include acquisition pilots that can provide improved acquisition performance. The acquisition pilots can also allow efficient determination of flexible parameters that determine preamble structure. The acquisition pilots can also facilitate quick paging capacity to scale with bandwidth.

Method 600 starts, at 602, when a first acquisition pilot signal is generated. The first acquisition pilot can be referred to as TDM3. In accordance with some aspects, the first acquisition pilot carries system determination information. The first acquisition pilot can indicate a cyclic prefix length used in data transmitted, whether synchronous or asynchronous operation is utilized, whether half-duplex operation is utilized, whether frequency re-use is utilized, or combinations thereof. At 604, the first acquisition pilot is transmitted to terminals within the wireless communication environment.

In accordance with some aspects, a second and/or third acquisition pilot can be created and transmitted. In an aspect, at 606, a second acquisition pilot signal, which might be referred to as (TDM2) is generated. The second acquisition pilot signal can include a sequence that depends on a sector identity. The second acquisition pilot can be generated utilizing one or more of the aspects described above. The first acquisition pilot signal can be scrambled by contents of the second acquisition pilot to distinguish different sectors.

At 608, a third acquisition pilot signal (sometimes referred to as TDM1) is generated. The third acquisition pilot can include a sequence that depends on a bandwidth of operation and a cyclic prefix. The third acquisition pilot can carry a unique sequence and can be generated utilizing one or more of the above disclosed aspects.

At 604, any combination of the first, second, or third acquisition pilots are transmitted. In accordance with some aspects, the first, second, or third acquisition pilot are carried within a superframe preamble. The acquisition pilot signals can be consecutive OFDM symbols or non-consecutive OFDM symbols.

In accordance with some aspects, orthogonal sequences of the acquisition pilot signals are different. In some aspects, the orthogonal sequence is different for the second (TDM2) and the first (TDM3) acquisition pilot signals based on a Walsh Code. In some aspects, the three acquisition pilot signals comprise any set of sequences and are not limited to orthogonal sequences. Additionally or alternatively, a center subcarrier of the acquisition pilots is approximately a center subcarrier of the acquisition pilots.

FIG. 7 illustrates a method 700 for receiving an acquisition pilot that includes system-determination information. At 702, an access terminal attempts to detect a first acquisition pilot (TDM3). The first acquisition pilot can include system determination information. For example, the system determination information can indicate whether synchronous or asynchronous operation is utilized, whether half-duplex operation is utilized, whether frequency re-use is utilized, or combinations thereof. The first acquisition pilot can be carried within a superframe preamble that includes at least three OFDM symbols. At 704, information included in the first acquisition pilot to utilized to obtain the system determination information.

In accordance with some aspects, method 700 also includes correlating a second acquisition pilot, at 706, using different sector hypotheses. The second acquisition pilot can be referred to as TDM2. In an aspect, the access terminal can efficiently correlate with all sector hypotheses using the FHT. In some aspects, TDM2 may be used by including symbol repetition for different sizes of bandwidth deployments or FFT sizes (e.g., 1.25 MHz and 2.5 MHz FFTs).

Using the TDM2 information, the access terminal correlates with TDM3 (the first acquisition pilot), at 708, using an FHT or other approach. In an aspect, this can be facilitated by descrambling TDM3 using the PN sequence or phase scrambling used on TDM2. Generally, the information carried on TDM3 is utilized to demodulate the broadcast, power control, and other channels (e.g., F-PBCCH and F-SBCCH). These channels carry configuration information that enables the terminal to demodulate forward link data (e.g., F-PBCCH carries the exact FFT size and number of guard subcarriers of the deployment or that is currently being used). In an aspect, F-PBCCH may also carry nine LSBs of system time to enable the terminal to convert PilotPhase into PilotPN for synchronous systems.

In accordance with some aspects, method 700 continues, at 710, when a third acquisition pilot is detected. This third acquisition pilot can be referred to as TDM1. The detection can be across a portion of the bandwidth, or substantially all of the bandwidth. In an aspect, the access terminal looks for TDM1 over a 1.25 MHz bandwidth. It should be noted that in some aspects, TDM1 waveforms for all bandwidths look identical over this frequency span. In accordance with some aspects, the bandwidth (e.g., 1.25 MHz) is selected to be the minimum supported bandwidth, thus ensuring that no out-of-band interference influences this detection.

Figure 8:
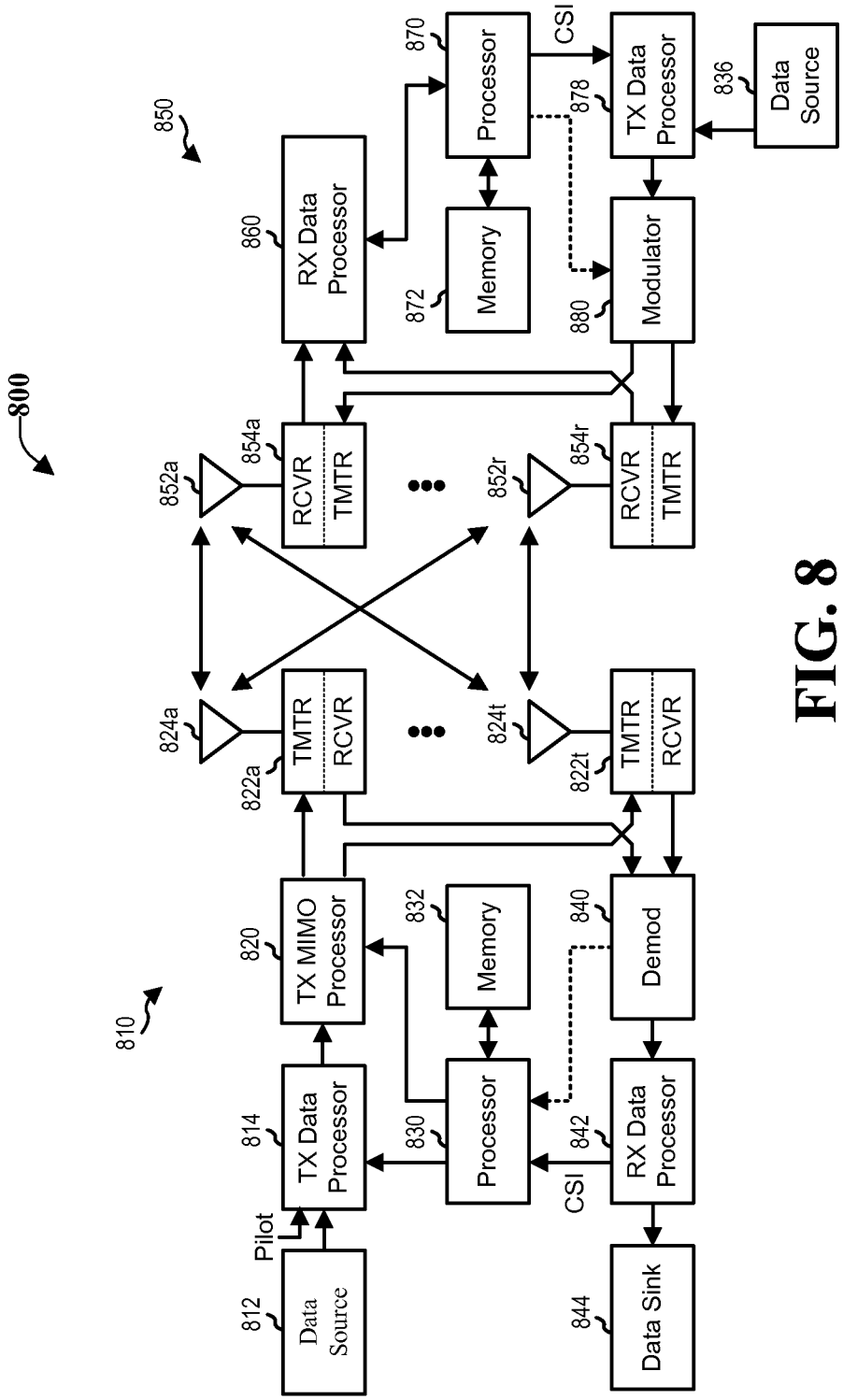
FIG. 8 illustrates a block diagram of an embodiment of a transmitter system and a receiver system.

Referring to FIG. 8, a block diagram of an embodiment of a transmitter system 810 and a receiver system 850 in a MIMO system 800 is illustrated. At transmitter system 810, traffic data for a number of data streams is provided from a data source 812 to transmit (TX) data processor 814. In an embodiment, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or MQAM) selected for that data stream to provide modulation symbols. The data rate, coding, and modulation for each data stream may be determined by instructions performed on provided by processor 830.

The modulation symbols for all data streams are then provided to a TX processor 820, which may further process the modulation symbols (e.g., for OFDM). TX processor 820 then provides NT modulation symbol streams to NT transmitters (TMTR) 822a through 822t. Each transmitter 822 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 822a through 822t are then transmitted from NT antennas 824a through 824t, respectively.

At receiver system 850, the transmitted modulated signals are received by NR antennas 852a through 852r and the received signal from each antenna 852 is provided to a respective receiver (RCVR) 854. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the NR received symbol streams from NR receivers 854 based on a particular receiver processing technique to provide NT "detected" symbol streams. The processing by RX data processor 860 is described in further detail below. Each detected symbol stream includes symbols that are estimates of the modulation symbols transmitted for the corresponding data stream. RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810.

The channel response estimate generated by RX data processor 860 may be used to perform space, space/time processing at the receiver, adjust power levels, change modulation rates or schemes, or other actions. RX data processor 860 may further estimate the signal-to-noise-and-interference ratios (SNRs) of the detected symbol streams, and possibly other channel characteristics, and provides these quantities to a processor 870. RX data processor 860 or processor 870 may further derive an estimate of the "operating" SNR for the system. Processor 870 then provides channel state information (CSI), which may comprise various types of information regarding the communication link and/or the received data stream. For example, the CSI may comprise only the operating SNR. The CSI is then processed by a TX data processor 878, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to recover the CSI reported by the receiver system. The reported CSI is then provided to processor 830 and used to (1) determine the data rates and coding and modulation schemes to be used for the data streams and (2) generate various controls for TX data processor 814 and TX MIMO processor 820. Alternatively, the CSI may be utilized by processor 830 to determine modulation schemes and/or coding rates for transmission, along with other information. This may then be provided to the transmitter that uses this information, which may be quantized, to provide later transmissions to the receiver.

Processors 830 and 870 direct the operation at the transmitter and receiver systems, respectively. Memories 832 and 872 provide storage for program codes and data used by processors 830 and 870, respectively. For duplex data communication, the roles of receiver system 850 and transmitter system 810 can be interchangeable, with data traffic in the reverse direction being provided from data source 836, transmitted to transmitter system 810 in a similar manner to that described above, decoded at transmitter system 810, and provided to data sink 844 for storage.

At the receiver, various processing techniques may be used to process the NR received signals to detect the NT transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

As used herein, the terms broadcast and multicast may be applied to the same transmission. That is, a broadcast need not be sent to all terminals of an access point or sector.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with instructions (e.g., procedures, functions, and so on) that may be utilized to perform functions described herein. The instructions may be stored in a memory (e.g., memory 832 or 872 in FIG. 8) or other computer program product and executed by a processor (e.g., processor 830 or 870). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Figure 9:
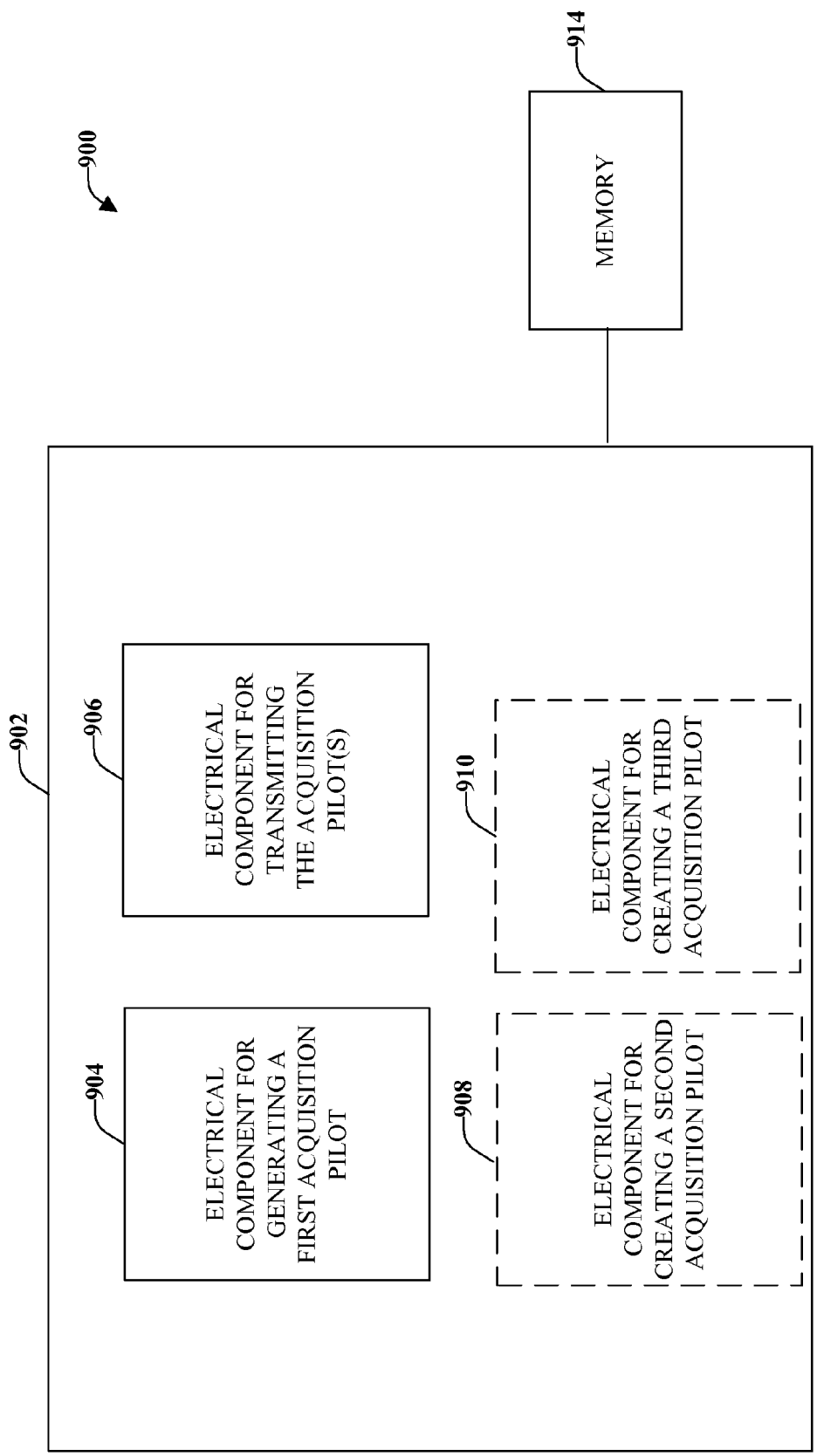
FIG. 9 illustrates a system for communicating information in a wireless communications environment.

FIG. 9 illustrates a system 900 for communicating information in a wireless communications environment. System 900 may reside at least partially within a base station. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 can include an electrical component for generating a first acquisition pilot 904, which can also be referred to as TDM3. The first acquisition pilot can include system determination information. The second acquisition pilot can indicate a cyclic prefix length used in data transmitted, whether synchronous or asynchronous operation is utilized, whether half-duplex operation is utilized, whether frequency re-use is utilized by a superframe, or combinations thereof.

Also included in logical grouping 902 is an electrical component for transmitting the first acquisition pilot 906. In accordance with some aspects, the first acquisition pilot can be carried within a superframe preamble.

In accordance with some aspects, included in logical grouping 902 is an electrical component for producing a second acquisition pilot 908. The second acquisition pilot is sometimes referred to as TDM2. The second acquisition pilot can include a sequence that depends on a sector identity. The second acquisition pilot can be carried within a superframe preamble.

In other aspects, logical grouping 902 also includes an electrical component for creating a third acquisition pilot 910. This third acquisition pilot can also be referred to as TDM1. The third acquisition pilot can include a sequence that depends on a bandwidth of operation and a cyclic prefix. In accordance with some aspects, the third acquisition pilot can be carried within a superframe preamble.

Alternatively or additionally, electrical component 906 can include one or more of the first, second, and third acquisition pilots in the superframe preamble, which is transmitted by electrical component 906. The first, second, and third acquisition pilots can comprise any set of sequences. In accordance with some aspects, if orthogonal sequences are utilized, the orthogonal sequences are different for the first (TDM3) and second (TDM2) acquisition pilots based on a Walsh Code. The GCL sequences of the third acquisition pilot are not orthogonal with respect to each other. The first acquisition pilot can be scrambled by contents of the second acquisition pilot. Further, a center subcarrier of the acquisition pilots is approximately a center subcarrier of the acquisition pilots.

The first, second, and third orthogonal sequences can be non-consecutive OFDM symbols, consecutive OFDM symbols, or combinations thereof. In some aspects, there are at least three OFDM symbols in the superframe preamble.

Additionally, system 900 can include a memory 914 that retains instructions for executing functions associated with electrical components 904, 906, 908, and 910 or other components. While shown as being external to memory 914, it is to be understood that one or more of electrical components 904, 906, 908, and 910 may exist within memory 914.

Figure 10:
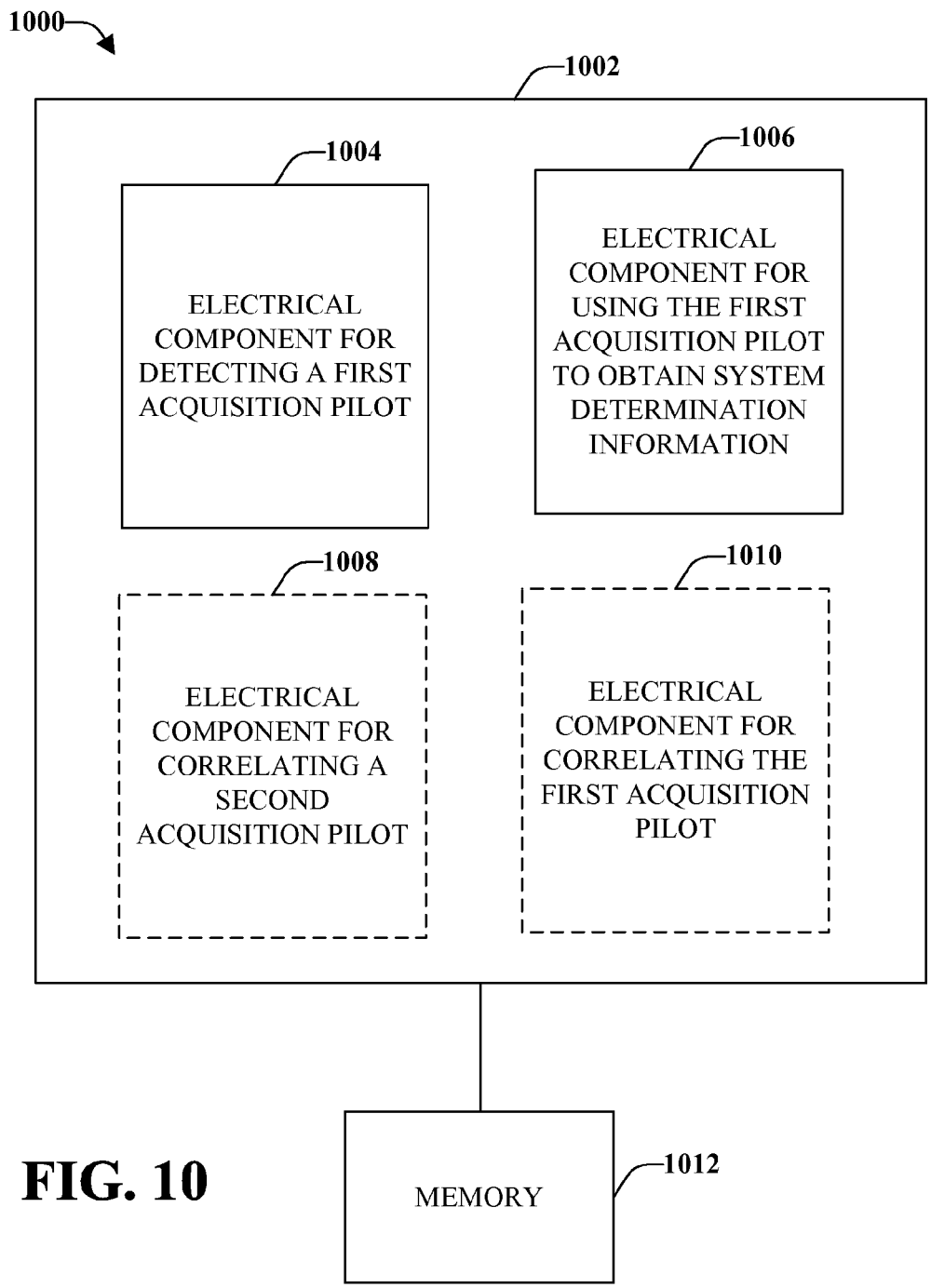
FIG. 10 illustrates a system for receiving information in a wireless communications environment.

FIG. 10 illustrates a system 1000 for receiving information in a wireless communications environment. System 1000 can reside at least partially within a terminal. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 can include an electrical component for detecting a first acquisition pilot 1004. The first acquisition pilot can be carried within a superframe preamble and can be referred to as TDM3. There can be at least three OFDM symbols in the superframe preamble. Logical grouping 1002 can also include an electrical component for using the first acquisition pilot to obtain system determination information 1006. The first acquisition pilot can indicate whether synchronous or asynchronous operation is utilized, whether half-duplex operation is utilized, whether frequency re-use is utilized, or combinations thereof.

Additionally or alternatively, logical grouping 1002 can include an electrical component for correlating a second acquisition pilot 1008 using a sector hypothesis. The second acquisition pilot can be referred to as TDM2. Also included in logical grouping 1002 can be an electrical component for correlating the first acquisition pilot 1010. The first acquisition pilot (TDM3) can be correlating utilizing information included in the second acquisition pilot (TDM2). Correlating the first acquisition pilot can include correlating using FHT. In accordance with some aspects, correlating the first acquisition pilot includes correlating using a PN sequence or phase offset obtained from the second acquisition pilot.

In accordance with some aspects, logical grouping 1002 can also include an electrical component for detecting a third acquisition pilot, which can be referred to as TDM1. The third acquisition pilot can indicate a cyclic prefix length used in the transmitted data. In some aspects, the first acquisition pilot is scrambled by contends of the second acquisition pilot to distinguish sectors. The first, second, and third sequences can be non-consecutive OFDM symbols or consecutive OFDM symbols, or combinations thereof.

Additionally, system 1000 can include a memory 1012 that retains instructions for executing functions associated with electrical components 1004, 1006, 1008 and 1010 or other components. While shown as being external to memory 1012, it is to be understood that one or more of electrical components 1004, 1006, 1008 and 1010 may exist within memory 1012.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for transmitting information in a wireless communication system, comprising:
   generating a first acquisition pilot that carries system determination information;
   generating a second acquisition pilot based on a sector identity; and
   transmitting the first and second acquisition pilots to terminals within the wireless communication system, wherein the first acquisition pilot is sent on a set of subcarriers centered at or near a center frequency of a carrier.

2. The method of claim 1, wherein the first acquisition pilot is carried within a superframe preamble.

3. The method of claim 1, wherein the first acquisition pilot is sent on a subset of all subcarriers available for transmission in the wireless communication system.

4. The method of claim 1, wherein the second acquisition pilot is generated based further on a bandwidth of operation, or a cyclic prefix length, or both.

5. The method of claim 1, further comprising:
   generating a third acquisition pilot that includes a sequence that depends on a bandwidth of operation, or a cyclic prefix length, or both.

6. The method of claim 1, wherein the first acquisition pilot is scrambled by contents of the second acquisition pilot to distinguish sectors.

7. The method of claim 1, wherein the first and second acquisition pilots are transmitted in non-consecutive orthogonal frequency division multiplexing (OFDM) symbols.

8. The method of claim 1, wherein the first and second acquisition pilots are transmitted in consecutive orthogonal frequency division multiplexing (OFDM) symbols.

9. The method of claim 1, wherein the first acquisition pilot is generated utilizing one of a set of orthogonal sequences.

10. The method of claim 9, wherein the set of orthogonal sequences is a set of Walsh codes.

11. The method of claim 1, wherein a center subcarrier of the first acquisition pilot is approximately a center subcarrier of the first and second acquisition pilots.

12. The method of claim 1, wherein the first acquisition pilot indicates a cyclic prefix length used in data transmitted.

13. The method of claim 1, wherein the first acquisition pilot indicates whether synchronous or asynchronous operation is utilized.

14. The method of claim 1, wherein the first acquisition pilot indicates whether half-duplex operation is utilized.

15. The method of claim 1, wherein the first acquisition pilot indicates whether frequency re-use is utilized.

16. The method of claim 2, wherein there are at least three orthogonal frequency division multiplexing (OFDM) symbols in the superframe preamble.

17. A wireless communications apparatus, comprising:
    at least one processor configured to generate a first acquisition pilot that carries system determination information, to generate a second acquisition pilot based on a sector identity, and to transmit the first and second acquisition pilots, wherein the first acquisition pilot is sent on a set of subcarriers centered at or near a center frequency of a carrier; and
    a memory coupled to the at least one processor.

18. The wireless communications apparatus of claim 17, wherein the first acquisition pilot is carried within a superframe preamble.

19. The wireless communications apparatus of claim 17, wherein the first acquisition pilot is sent on a subset of all subcarriers available for transmission in the wireless communication system.

20. The wireless communications apparatus of claim 17, wherein the at least one processor is further configured to generate the second acquisition pilot based further on a bandwidth of operation, or a cyclic prefix length, or both.

21. The wireless communications apparatus of claim 17, wherein the at least one processor is further configured to generate a third acquisition pilot that includes a sequence that depends on a bandwidth of operation, or a cyclic prefix length, or both.

22. The wireless communications apparatus of claim 17, wherein the first acquisition pilot is scrambled by contents of the second acquisition pilot to distinguish sectors.

23. The wireless communications apparatus of claim 17, wherein the first and second acquisition pilots are transmitted in non-consecutive orthogonal frequency division multiplexing (OFDM) symbols.

24. The wireless communications apparatus of claim 17, wherein the first and second acquisition pilots are transmitted in consecutive orthogonal frequency division multiplexing (OFDM) symbols.

25. The wireless communications apparatus of claim 17, wherein the first acquisition pilot is generated utilizing one of a set of orthogonal sequences.

26. The wireless communications apparatus of claim 25, wherein the set of orthogonal sequences is a set of Walsh codes.

27. The wireless communications apparatus of claim 17, wherein a center subcarrier of the first acquisition pilot is approximately a center subcarrier of the first and second acquisition pilots.

28. The wireless communications apparatus of claim 17, wherein the first acquisition pilot indicates a cyclic prefix length used in data transmitted.

29. The wireless communications apparatus of claim 17, wherein the first acquisition pilot indicates whether synchronous or asynchronous operation is utilized.

30. The wireless communications apparatus of claim 17, wherein the first acquisition pilot indicates whether half-duplex operation is utilized.

31. The wireless communications apparatus of claim 17, wherein the first acquisition pilot indicates whether frequency re-use is utilized.

32. The wireless communications apparatus of claim 18, wherein there are at least three orthogonal frequency division multiplexing (OFDM) symbols in the superframe preamble.

33. A wireless communications apparatus that communicates information, comprising:

means for generating a first acquisition pilot that carries system determination information;

means for generating a second acquisition pilot based on a sector identity; and means for transmitting the first and second acquisition pilots to terminals within a wireless communication system, wherein the first acquisition pilot is sent on a set of subcarriers centered at or near a center frequency of a carrier.

34. The wireless communications apparatus of claim 33, wherein the first acquisition pilot is carried within a superframe preamble.

35. The wireless communications apparatus of claim 33, further comprising:

means for generating a third acquisition pilot that includes a sequence that depends on a bandwidth of operation, or a cyclic prefix length, or both.

36. The wireless communications apparatus of claim 33, wherein the first acquisition pilot is scrambled by contents of the second acquisition pilot to distinguish sectors.

37. The wireless communications apparatus of claim 33, wherein the first and second acquisition pilots are transmitted in non-consecutive orthogonal frequency division multiplexing (OFDM) symbols.

38. The wireless communications apparatus of claim 33, wherein the first and second acquisition pilots are transmitted in consecutive orthogonal frequency division multiplexing (OFDM) symbols.

39. The wireless communications apparatus of claim 33, wherein the first acquisition pilot is generated utilizing one of a set of orthogonal sequences.

40. The wireless communications apparatus of claim 39, wherein the set of orthogonal sequences is a set of Walsh Codes.

41. The wireless communications apparatus of claim 33, wherein a center subcarrier of the first acquisition pilot is approximately a center subcarrier of the first and second acquisition pilots.

42. The wireless communications apparatus of claim 33, wherein the first acquisition pilot indicates a cyclic prefix length used in data transmitted.

43. The wireless communications apparatus of claim 33, wherein the first acquisition pilot indicates whether synchronous or asynchronous operation is utilized.

44. The wireless communications apparatus of claim 33, wherein the first acquisition pilot indicates whether half-duplex operation is utilized.

45. The wireless communications apparatus of claim 33, wherein the first acquisition pilot indicates whether frequency re-use is utilized.

46. The wireless communications apparatus of claim 34, wherein there are at least three orthogonal frequency division multiplexing (OFDM) symbols in the superframe preamble.

47. A computer program product, comprising:

a non-transitory computer-readable medium comprising:

code for causing at least one computer to generate a first acquisition pilot that carries system determination information;

code for causing the at least one computer to generate a second acquisition pilot based on a sector identity; and code for causing the at least one computer to convey the first and second acquisition pilots to terminals within a wireless communication system, wherein the first acquisition pilot is sent on a set of subcarriers centered at or near a center frequency of a carrier.

48. A wireless communication apparatus, comprising:

a processor configured to:

generate a first acquisition pilot that carries system determination information;

generate a second acquisition pilot based on a sector identity; and transmit the first and second acquisition pilots to terminals within a wireless communication system, wherein the first acquisition pilot is sent on a set of subcarriers centered at or near a center frequency of a carrier; and a memory coupled to the processor.

49. A method for receiving information in a wireless communications system, comprising:

detecting a first acquisition pilot sent on a set of subcarriers centered at or near a center frequency of a carrier;

utilizing the first acquisitidn pilot to obtain system determination information;

detecting a second acquisition pilot; and utilizing the second acquisition pilot to obtain a sector identity.

50. The method of claim 49, wherein the first acquisition pilot is carried within a superframe preamble.

51. The method of claim 49, wherein the first acquisition pilot includes system determination information.

52. The method of claim 49, further comprising:

correlating the second acquisition pilot using a sector hypothesis.

53. The method of claim 49, further comprising:

correlating the first acquisition pilot using one of a set of orthogonal sequences.

54. The method of claim 49, further comprising:

correlating the first acquisition pilot using a PN sequence or a phase offset obtained from the second acquisition pilot.

55. The method of claim 49, wherein the first acquisition pilot is scrambled by contents of the second acquisition pilot to distinguish sectors.

56. The method of claim 49, further comprising:

detecting a third acquisition pilot, wherein the third acquisition pilot indicates a cyclic prefix length used in transmitted data.

57. The method of claim 49, wherein the first and second acquisition pilots are detected in non-consecutive orthogonal frequency division multiplexing (OFDM) symbols.

58. The method of claim 49, wherein the first and second acquisition pilots are detected in consecutive orthogonal frequency division multiplexing (OFDM) symbols.

59. The method of claim 49, wherein the first acquisition pilot is sent on a subset of all subcarriers available for transmission in the wireless communication system.

60. The method of claim 49, wherein the first acquisition pilot indicates whether synchronous or asynchronous operation is utilized, or whether half-duplex operation is utilized, or whether frequency re-use is utilized, or combinations thereof.

61. A wireless communications apparatus, comprising:

at least one processor configured to detect a first acquisition pilot sent on a set of subcarriers centered at or near a center frequency of a carrier, to utilize the first acquisition pilot to obtain system determination information, to detect a second acquisition pilot, and to utilize the second acquisition pilot to obtain a sector identity; and a memory coupled to the at least one processor.

62. The wireless communications apparatus of claim 61, wherein the first acquisition pilot is carried within a superframe preamble.

63. The wireless communications apparatus of claim 61, wherein the first acquisition pilot includes system determination information.

64. The wireless communications apparatus of claim 61, wherein the at least one processor is further configured to correlate the second acquisition pilot using a sector hypothesis.

65. The wireless communications apparatus of claim 61, wherein the at least one processor is further configured to correlate the first acquisition pilot using one of a set of orthogonal sequences.

66. The wireless communications apparatus of claim 61, wherein the at least one processor is further configured to correlate the first acquisition pilot using a PN sequence or a phase offset obtained from the second acquisition pilot.

67. The wireless communications apparatus of claim 61, wherein the first acquisition pilot is scrambled by contents of the second acquisition pilot to distinguish sectors.

68. The wireless communications apparatus of claim 61, wherein the at least one processor is further configured to detect a third acquisition pilot, wherein the third acquisition pilot indicates a cyclic prefix length used in transmitted data.

69. The wireless communications apparatus of claim 61, wherein the first and second acquisition pilots are detected in non-consecutive orthogonal frequency division multiplexing (OFDM) symbols.

70. The wireless communications apparatus of claim 61, wherein the first and second acquisition pilots are detected in consecutive orthogonal frequency division multiplexing (OFDM) symbols.

71. The wireless communications apparatus of claim 61, wherein the first acquisition pilot is sent on a subset of all subcarriers available for transmission in the wireless communication system.

72. The wireless communications apparatus of claim 61, wherein the first acquisition pilot indicates whether synchronous or asynchronous operation is utilized, or whether half-duplex operation is utilized, or whether frequency re-use is utilized, or combinations thereof.

73. A wireless communications apparatus that receives information, comprising:
    means for detecting a first acquisition pilot sent on a set of subcarriers centered at or near a center frequency of a carrier;
    means for utilizing the first acquisition pilot to obtain system determination information;
    means for detecting a second acquisition pilot; and
    means for utilizing the second acquisition pilot to obtain a sector identity.

74. The wireless communications apparatus of claim 73, wherein the first acquisition pilot is carried within a superframe preamble.

75. The wireless communications apparatus of claim 73, wherein the first acquisition pilot includes system determination information.

76. The wireless communications apparatus of claim 73, further comprising:
    means for correlating the second acquisition pilot using a sector hypothesis.

77. The wireless communications apparatus of claim 73, further comprising:
    means for correlating the first acquisition pilot using one of a set of orthogonal sequences.

78. The wireless communications apparatus of claim 73, further comprising:
    means for correlating the first acquisition pilot using a PN sequence or a phase offset obtained from the second acquisition pilot.

79. The wireless communications apparatus of claim 73, wherein the first acquisition pilot is scrambled by contents of the second acquisition pilot to distinguish sectors.

80. The wireless communications apparatus of claim 73, further comprising:
    means for detecting a third acquisition pilot, wherein the third acquisition pilot indicates a cyclic prefix length used in transmitted data.

81. The wireless communications apparatus of claim 73, wherein the first and second acquisition pilots are detected in non-consecutive orthogonal frequency division multiplexing (OFDM) symbols.

82. The wireless communications apparatus of claim 73, wherein the first and second acquisition pilots are detected in consecutive orthogonal frequency division multiplexing (OFDM) symbols.

83. The wireless communications apparatus of claim 73, wherein the first acquisition pilot is sent on a subset of all subcarriers available for transmission in the wireless communication system.

84. The wireless communications apparatus of claim 73, wherein the first acquisition pilot indicates whether synchronous or asynchronous operation is utilized, or whether half-duplex operation is utilized, or whether frequency re-use is utilized, or combinations thereof.

85. A computer program product, comprising:
    a non-transitory computer-readable medium comprising:
        code for causing at least one computer to detect a first acquisition pilot sent on a set of subcarriers centered at or near a center frequency of a carrier;
        code for causing the at least one computer to obtain system determination information from the first acquisition pilot;
        code for causing the at least one computer to detect a second acquisition pilot; and
        code for causing the at least one computer to obtain a sector identity from the second acquisition pilot.

86. A wireless communication apparatus, comprising:
    a processor configured to:
        detect a first acquisition pilot that includes system determination information and is sent on a set of subcarriers centered at or near a center frequency of a carrier;
        obtain the system determination included in the first acquisition pilot;
        detect a second acquisition pilot; and
        obtain a sector identity from the second acquisition pilot, and
    a memory coupled to the processor.

* * * * *

UNITED STATES PATENT AND TRADEMARK OFFICE
CERTIFICATE OF CORRECTION

PATENT NO. : 8,630,241 B2  
APPLICATION NO. : 12/441109  
DATED : January 14, 2014  
INVENTOR(S) : Aamod Khandekar et al.

Page 1 of 1

It is certified that error appears in the above-identified patent and that said Letters Patent is hereby corrected as shown below:

In the Claims

Claim 49, Column 22, Line 18: "acquisitidn" should be changed to "acquisition"

Signed and Sealed this  
Twenty-fourth Day of January, 2023

Katherine Kelly Vidal  
*Director of the United States Patent and Trademark Office*